United States Patent [19]

Letts et al.

[11] Patent Number: 4,949,602
[45] Date of Patent: Aug. 21, 1990

[54] WRENCH

[75] Inventors: Robert A. Letts, Fleet; David G. Allen, Chiddingfold; Terence C. Bullen, Guildford, all of England

[73] Assignee: MHH Engineering Co., Ltd., Guilford, England

[21] Appl. No.: 291,720

[22] Filed: Dec. 29, 1988

[30] Foreign Application Priority Data

Dec. 30, 1987 [GB] United Kingdom ............... 8730296
Jun. 18, 1988 [GB] United Kingdom ............... 8814542

[51] Int. Cl.$^5$ .............................................. B25B 23/14
[52] U.S. Cl. .......................................... 81/467; 81/472
[58] Field of Search ............... 81/467 OR, 468, 472 X, 81/479, 475; 173/12

[56] References Cited

U.S. PATENT DOCUMENTS 4,762,030 8/1988 Nguyen ................................ 81/472

Primary Examiner—Frederick R. Schmidt
Assistant Examiner—Lawrence Cruz
Attorney, Agent, or Firm—Ratner & Prestia

[57] ABSTRACT

The wrench is for use with a bolt having an axial bore in which is located a pin. The pin is rotatable within the bore until the bolt is tensioned near its elastic limit, at which point rotation of the pin relative to the bolt is restrained.

The wrench includes a body (12) drivingly carrying via dogs (20) a first socket (16) for engaging and driving a nut on the bolt. A second socket (28) engages a head on the pin. The first and second sockets (16,28) are connected to a common drive, the connection of the second socket (28) being in a coupling in which a pin (46) engages in a detent in a cam cylinder (50).

When rotation of the pin relative to the bolt becomes restrain bed, the coupling (46,50) disengages, allowing the cam cylinder (50) to be urged outwardly of the housing (12) by a spring (60), to cause a warning indicator (58) to be displayed.

11 Claims, 12 Drawing Sheets

WRENCH

This invention relates to a wrench.

BACKGROUND OF THE INVENTION

Recently a bolt has been developed for accurately indicating when the optimum tension has been applied to the bolt in use, and an object of the present invention is to provide a wrench for use in installing such bolts or tightening nuts onto them.

SUMMARY OF THE INVENTION

According to the present invention there is provided a wrench for use with a nut and bolt combination in which a bolt has an axial bore in its stem and a pin member located within the bore; the wrench comprising a first engagement member for rotational engagement with one of the nuts and the bolt head, a second engagement member for rotational engagement with said pin member, a common drive member for simultaneous rotation of the first and second engagement members, and detection means for detecting a change in resistance to the rotation of the second engagement member.

In a preferred form of such a bolt having a bore in its stem and a pin or other member located within said bore, said change in resistance will be representative of the bolt deforming to grip the pin.

The drive member is preferably manually actuated and may include a handle rotatable about the axis of rotation of the first and second engagement members. The engagement members may be sockets, although either or both of them may be in the form of a projection for insertion in a socket in the bolt head and/or the pin or other member.

Preferably the detection means comprises a bayonet or detent arrangement which remains in engagement during low resistance of the pin or other member to rotation and which comes out of engagement when the resistance increases; disengagement may actuate an indicator or may actuate a mechanism which disengages the drive member from the first engagement member.

Said second engagement member is preferably coupled to the common drive member by torque limit means operable to limit the torque applied by the common drive member to the second engagement member. The torque limit means may comprise a shear pin fracturable by excess torque. Thereby the socket or other form of second engagement device becomes rotationally uncoupled from the rest of the wrench in the event that an attempt is made to continue tightening the nut beyond the point at which the bolt bore tightly grips the pin, and thus the pin is protected from being fractured by shearing due to excess torque. The torque limit means may be associated with a camming arrangement which causes at least partial axial separation of the second engagement member from the common drive means upon torque limiting operation of the torque limit means.

Said second engagement member may be coupled to the common drive member by a uni-directional clutch means such that a nut previously tightened on a bolt of the kind described may be unscrewed from the bolt by reverse rotation of the same wrench without triggering the detection means and/or causing malfunction or damage due to use of the wrench to apply torque in a direction opposite to that appropriate for tensioning of the bolt. If the second engagement member is coupled to the common drive means by both a torque limit means and a uni-directional clutch means, they would be linked in series such that relative rotation and/or torque transferring between the second engagement member and the common drive means passes through both the torque limit means and the uni-directional clutch means in turn.

Embodiments of the present invention will now be described by way of example with reference to the accompanying drawings in which:

BRIEF DESCRIPTION OF THE DRAWINGS

FIGS. 5(a) and (b) are respectively a side part-sectional view and an end view on A and B of a bayonet tube of the wrench of FIG. 2;

The bolt 2 (FIG. 1) for which the wrench of this invention is adapted has a stem 4 threaded along part of its length, in conventional fashion. The stem 4 has a central bore 6 extending along substantially the length of the threaded portion, and a pin 8 having an exposed head 10 is disposed within the bore 6.

Figure 1:
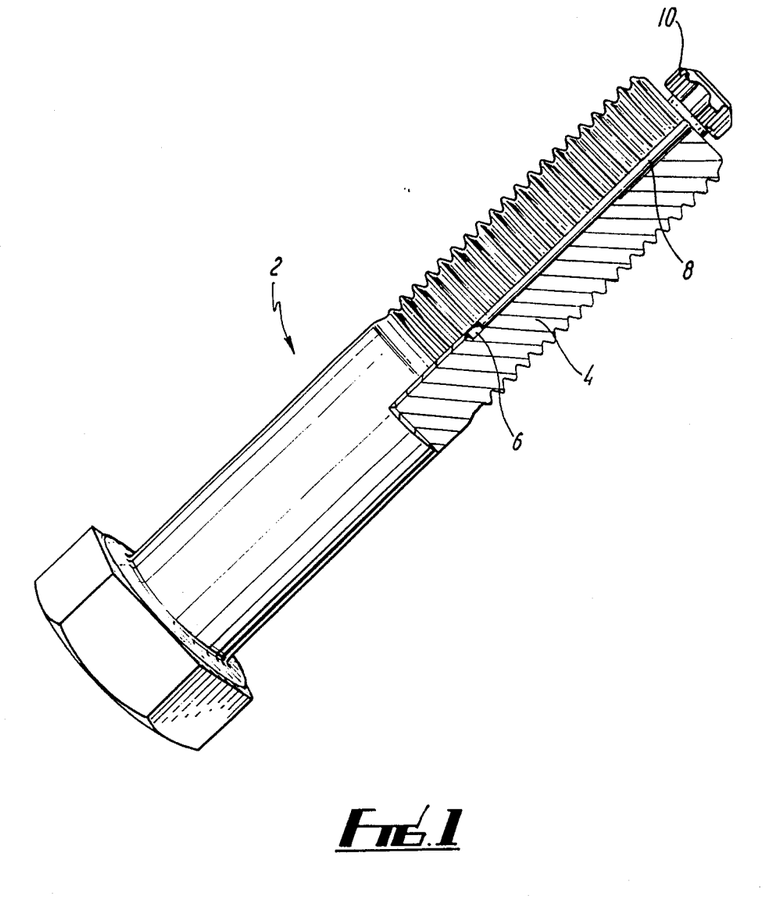
FIG. 1 is a side part-sectional view of a bolt with which the wrench of this invention is to be used.

Before a nut is tightened on the bolt 2 the pin 8 is free to rotate within the bore 6, but the dimensions of the pin 8 and bore 6 are such that as tightening proceeds the bolt stem 4 eventually undergoes plastic deformation which causes a slight contraction of its diameter causing the bore 6 to contract against the pin 8, providing resistance to continued rotation of the pin 8 in the bore 6. This resistance indicates that the bolt is at its maximum preload.

The first embodiment of wrench in accordance with the invention is designed to tighten nuts onto the bolts 2 and comprises a housing 12 (FIGS. 2 and 3) defining a through bore 14 one end portion of which is adapted to receive a bihexagonal socket head 16 of a dimension selected to receive and engage a nut 17. The socket head 16 engages in the bore 14 by means of dogs 18 on the head 16 which mate with complementary recesses 20 in the housing 12, and a wire retainer 22 in an annular groove in the housing 12 which engages in a corresponding groove 24 in the head 16. Sockets for alternative sizes of nuts are indicated at 16A and 16B in FIG. 3.

A pin socket assembly 26 (FIGS. 3 and 4) is located within the bore 14 and has a socket portion 28 shaped to receive and engage the head 10 of the pin 8. An abutment portion 30 bears against a flange of the housing and provides a shoulder against which one end of a spring 32 bears, the other end of the spring 32 biassing the socket portion 28 towards the socket head 16.

Figure 4:
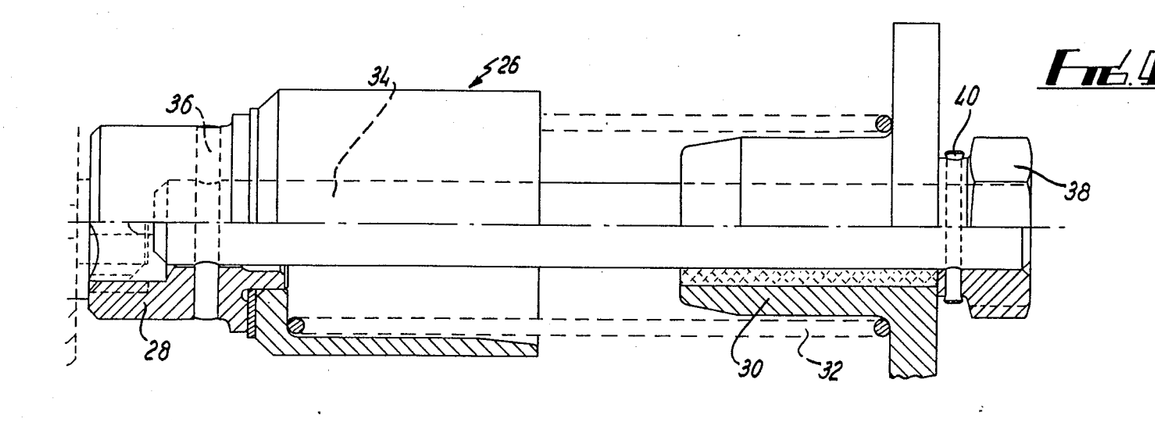
FIG. 4 is a side part-sectional view of a pin socket assembly of the wrench of FIG. 2.

A shaft 34 extends within a central bore through the pin socket assembly 26 and is held rigidly on the socket portion 28 by a swivel pin 36. The shaft 34 has at its opposite end a hexagonal nut 38 which is secured to the shaft 34 by a shear pin 40.

Figure 3:
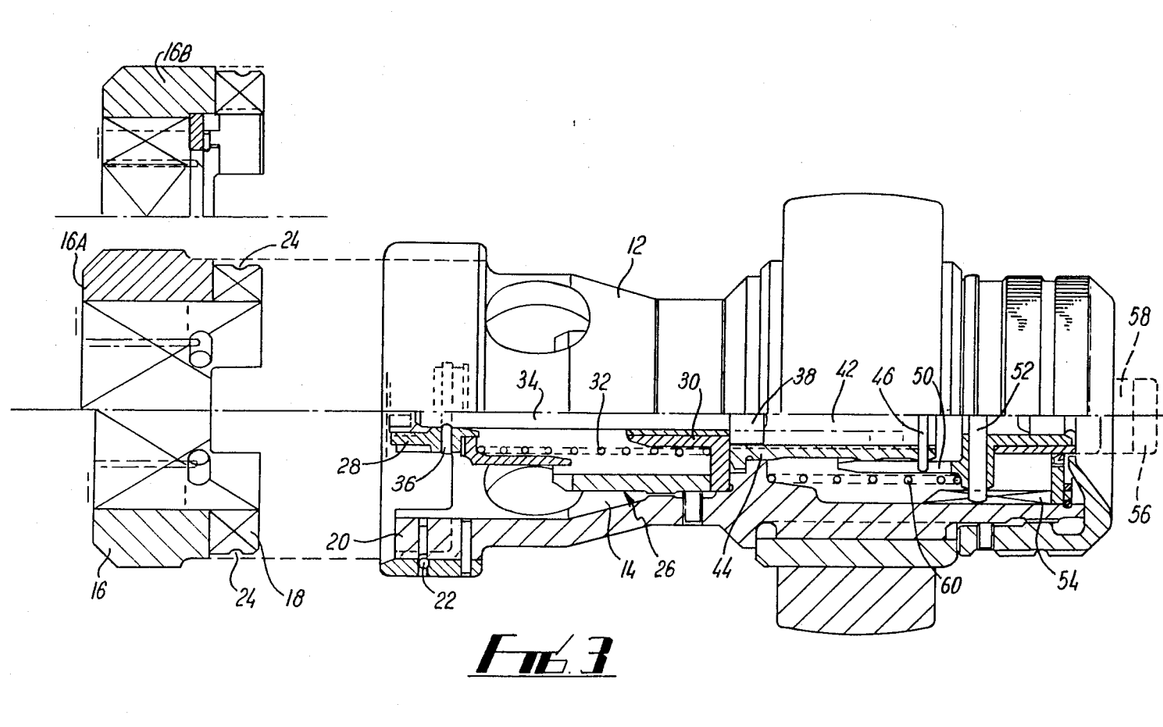
FIG. 3 a side part-sectional view of a central part of the wrench of FIG. 2 and its socket head.
Figures 5A, 5B:
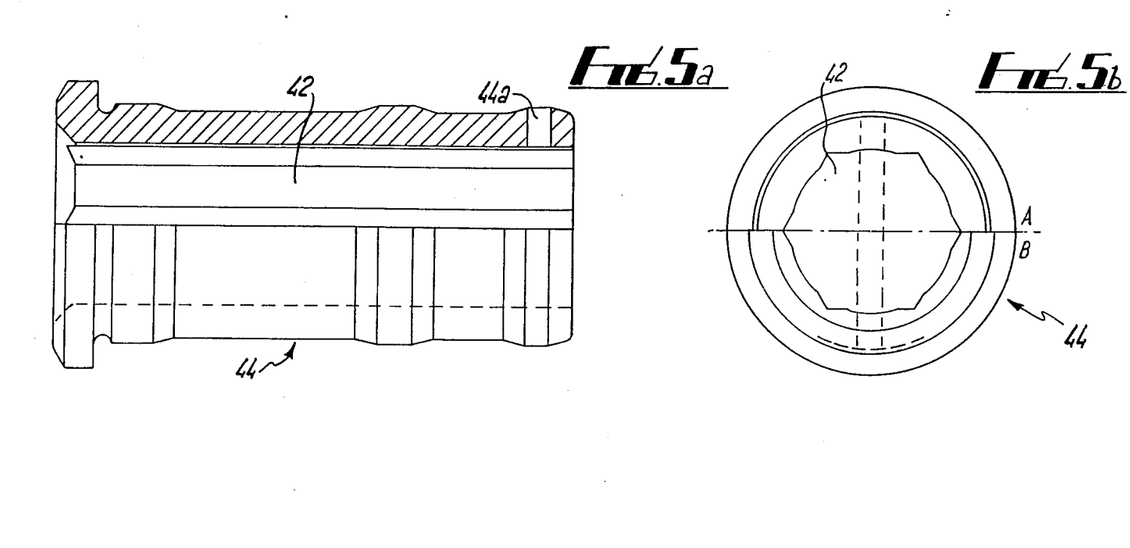

The shaft 34 is axially and angularly reciprocable relative to the abutment portion 30 and the nut 38 is axially slidable within a hexagonal-sectional central bore 42 in a bayonet tube 44 (FIGS. 3 and 5) which is held at one end against axial movement by the abutment portion 30 and a shoulder on the housing 12. Adjacent its other end the bayonet tube 44 carries in a through bore 44a a radially-extending pin 46 which extends into a slot 48 in a cam tube 50 (FIGS. 3 and 6).

The cam tube 50 is apertured radially at 64 to receive a locating pin 52 which extends into diametrically-opposed keyways 54 (only one being shown) in the housing, and the cam tube 50 carries at its extreme end an actuating button 56 which has a conspicuous red sleeve 58 around its black body. The cam tube 50 is biassed towards extension of the button from the housing 12 by a spring 60.

In use, an appropriately-sized socket head 16 is fitted onto the housing 12 and the button 56 is depressed against the action of the spring 60. This causes the cam tube 50 to move to the left, taking the pin 46 along the slot 48 until it bears against an angled wall portion 48a which results in the bayonet tube 44 rotating slightly until the pin seats in the end portion 48b. When the button 56 is released the cam tube 50 retracts and the pin 46 becomes seated in the recess 48c, thus locking the cam tube 50 and button 56 against further retraction. In this position the red sleeve 58 is hidden from view within the housing 12 and the button 56 is substantially flush with the end of the housing.

The tool is then applied to the nut to be secured to the bolt 2 in a manner whereby the nut enters the socket head 16 and the head 10 of the pin 8 enters the socket portion 28 of the socket assembly 26. The housing 12 is rotated by means of a radially-extending handle 62 which includes a double-acting ratchet mechanism 63, so that the nut is driven by the socket head 16 and the head 10 of the pin 8 is driven simultaneously by the socket portion 28. An extension handle 65 (FIG. 2) may be received within the outer end of the handle 63.

As the nut moves along the threaded portion of the bolt 2 the distance between it and the head 10 of the pin 8 increases, and this is allowed for in the tool by the socket portion 28, shaft 34 and nut 38 moving axially along the housing against the bias of the spring 32.

This action is continued until the nut is fully engaged on the bolt stem 4 and tightened to an extent where the stem 4 is under extension and on the point of plastic, rather than elastic, deformation. Further tightening of the nut causes the bore 6 to reduce in diameter against the pin 8. The resistance to rotation thus experienced by the pin 8 is transmitted through the socket portion 28, shaft 34 and nut 38 to the bayonet tube 44, causing it to rotate relative to the housing 12. This rotation of the bayonet tube 44 takes the pin 46 out of engagement with the recess 48c and into the main channel of the slot 48, allowing the spring 60 to move the cam tube 50 and button 56 in a direction out of the housing 12, so that the button 56 then stands proud of the housing and the red sleeve 58 is revealed. This indicates to an operator that the optimum amount of tension has been imparted to the bolt 2 and that he should immediately cease tightening the nut.

Figure 7:
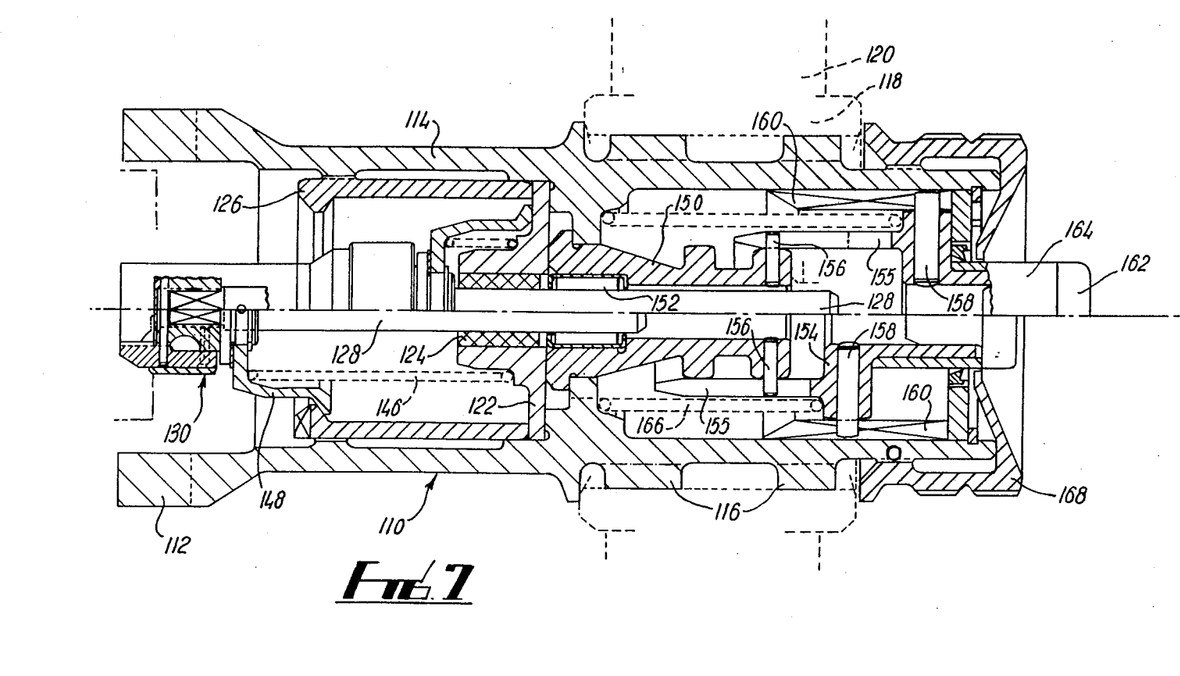
FIG. 7 is a sectional view of a second embodiment of a wrench in accordance with the invention.

Turning now to FIG. 7, this is a sectional view of the head of a second embodiment of wrench in accordance with the invention. This second embodiment of wrench functions on the same general principles as the wrench of the first embodiment (FIGS. 2 and 3), but has a number of modifications and variations relative thereto.

FIG. 7 is directly comparable with FIG. 3, and consists of two half-sections about the longitudinal centre-line of the wrench head. The lower half-section is of the wrench head immediately prior to use for tightening a nut onto a bolt of the type shown in FIG. 1, while the upper half-section shows the changed configuration of wrench head components when the nut has been tightened to an extent that the bolt 2 of FIG. 1 has plastically deformed to grip the pin 8.

Figure 2:
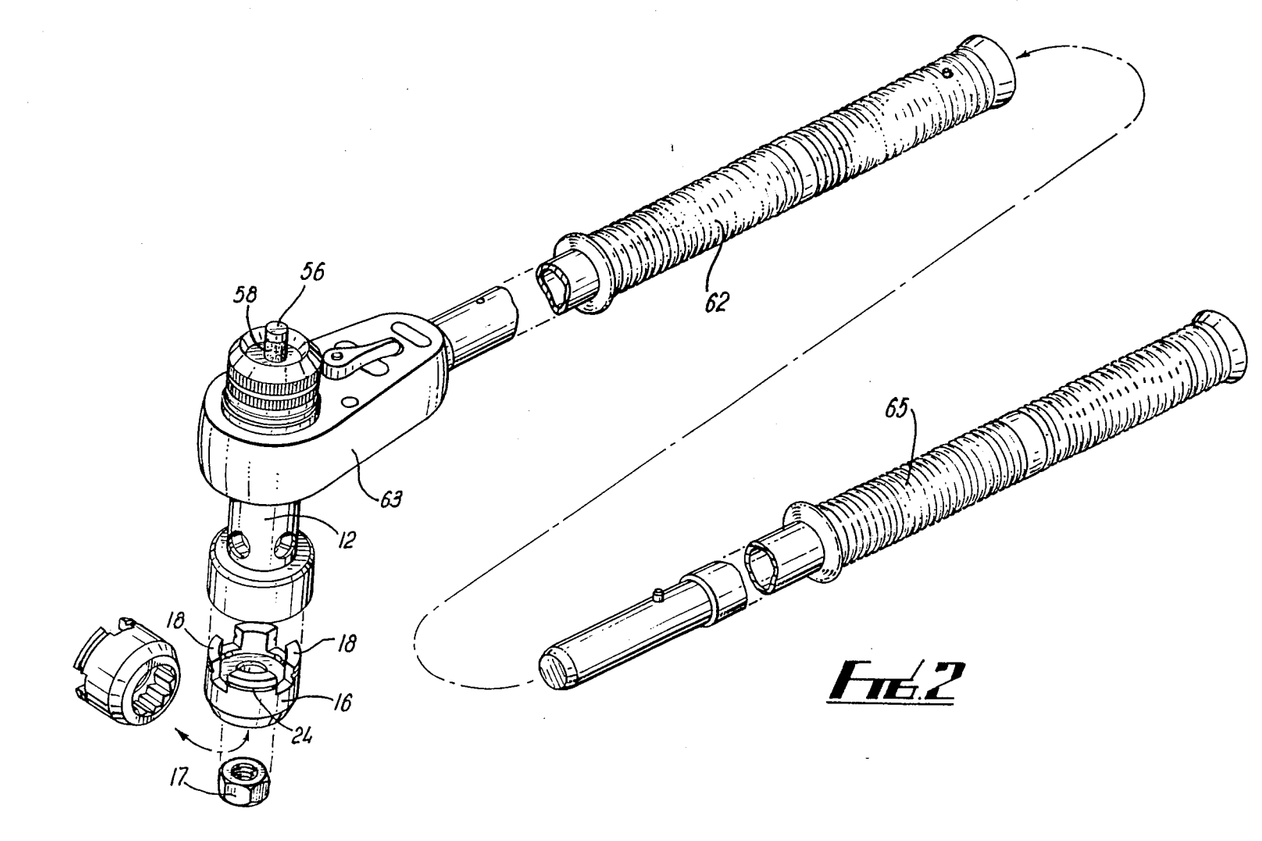
FIG. 2 is a perspective view of a first embodiment of a wrench of this invention.

The wrench head shown in FIG. 7 has a one-piece cylindrical body 110 with a castellated end 112 (equivalent to the dogs 18 of FIGS. 2 and 3) for receiving a bi-hex socket (not shown), a housing portion 114 (equivalent to the housing 12), and a ratchet tooth section 116 circumscribed by a bidirectional ratchet 118 on the end of a handle 120 (equivalent to the ratchet mechanism 63 and handle 62 of FIG. 2). Within the body 110, a plate 122 with a central bearing bush 124 is clamped by a screwed-in sleeve 126. The central bearing bush 124 rotatably and slidingly supports a cylindrical shaft 128 (equivalent to the shaft 34 in FIGS. 3 and 4). The end of the shaft 128 adjacent the socket end 112 of the wrench head body 110 is formed with a hexagonal cross-section onto which is clipped a pin socket assembly 130 (shown separately to an enlarged scale in FIGS. 8-10). The pin socket assembly 130 is equivalent to the pin socket assembly 26 of FIG. 4 in terms of engaging the head 10 of the bolt pin 8 (FIG. 1), but in this second embodiment, the pin socket assembly 130 also has a torque-limiting function by reason of being formed as a shear coupling (detailed below).

Figure 8:
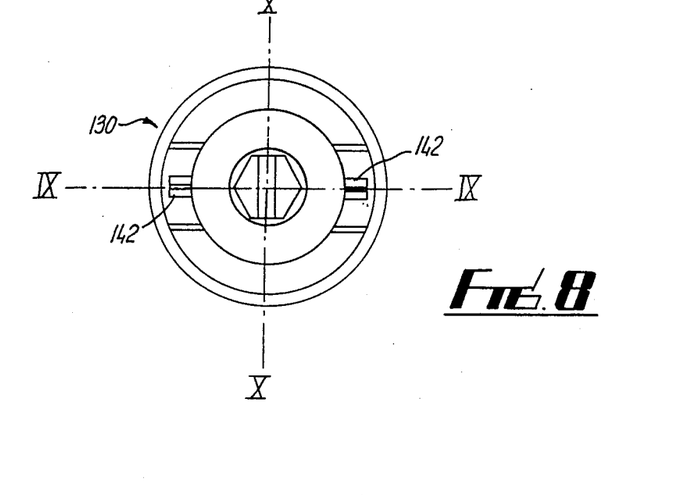
FIG. 8 is an end view of an integral socket and shear coupling assembly employed in the wrench of FIG. 7.
Figure 9:
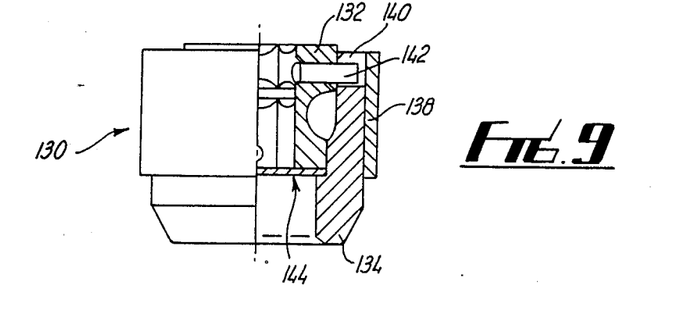
FIG. 9 is half-section on the line IX—IX in FIG. 8.
Figure 10:
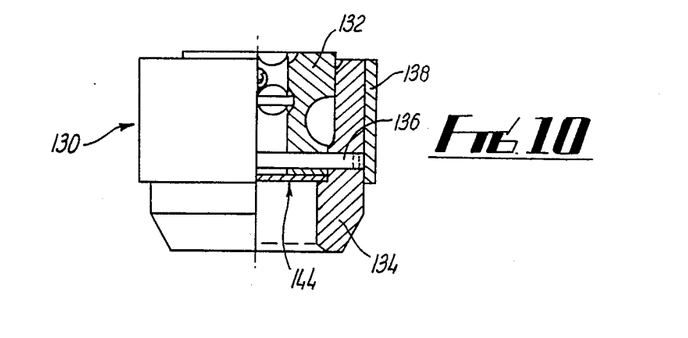
FIG. 10 is a half-section on the line X—X in FIG. 8.
Figure 11:
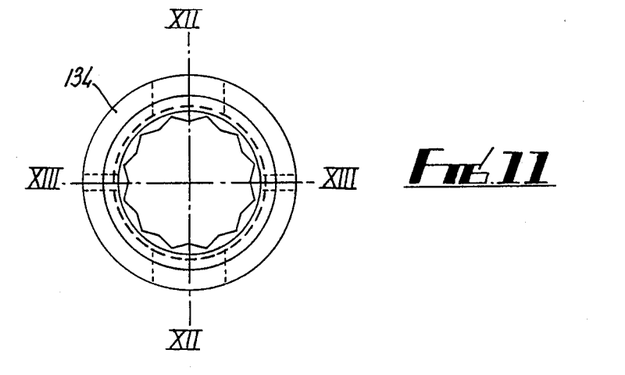
FIG. 11 is an end view of the socket employed in the assembly of FIG. 8.
Figure 12:
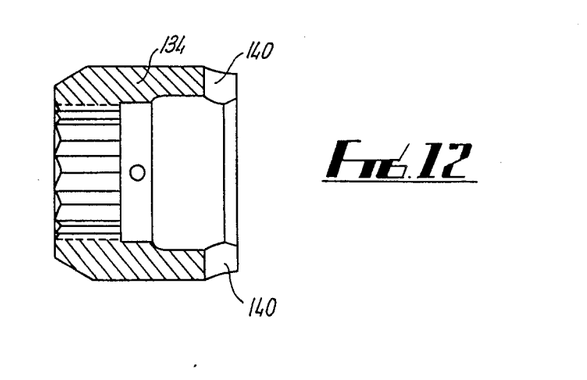
FIG. 12 is a section on the line XII—XII in FIG. 11.
Figure 13:
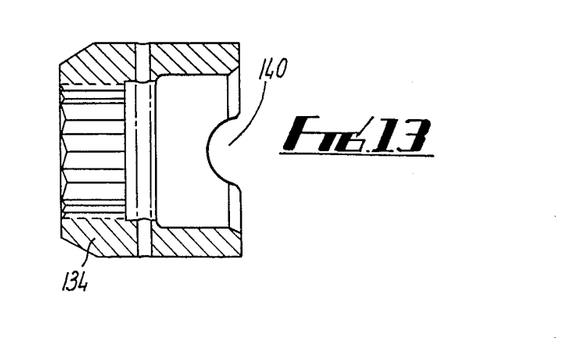
FIG. 13 is a section on the line XIII—XIII in FIG. 11.

Referring now to FIGS. 8, 9 and 10 wherein the pin socket assembly 130 is shown separated from the rest of the wrench head, and to an enlarged scale, the pin assembly 130 consists of an inner bush 132 which is nested within a socket 134 (shown separately in FIGS. 11, 12, and 13). The bush 132 has a hexagonal bore which is a snap fit on the hexagonal end of the shaft 128. The outer surface of the bush 132 and the inner face of the socket 134 are cylindrical so that one can rotate upon the other. However, such mutual rotation is normally prevented by an aluminum shear pin 136 (FIG. 10) diametrically linking the bush 132 to the socket 134. The dimensions of the components of the pin socket assembly 130, and of the shear pin 136 in particular, are such as to lock the bush 132 to the socket 134 under normal loadings, but to separate these components for mutual movement by shearing of the shear pin 136 upon a predetermined excess of torque being transmitted between the pin 8 (FIG. 1) and the shaft 128 (FIG. 7) by way of the pin socket assembly 130. Thereby the pin 8 is protected against being broken by the application of excessive torque after the bolt 2 has deformed to grip the pin 8. Such excess torque could occur upon continued (or attempted continuation of) tightening of the nut on to the bolt 2 after the pin 8 is gripped by deformation of the bore 6, due to transmission of torque through the detection system in the wrench head. Such excess torque could also occur upon use of the wrench for removal of the nut after tightening, due to rotation of the nut relative to the pin 8 which is gripped within the bolt 2 from which the nut is being unscrewed.

The pin socket assembly 130 includes an aluminium sleeve 138 which is press-fitted over the socket 134 after the pin 136 is fitted through the bush 132 and the socket 134, to ensure retention of the pin 136. The rim of the socket 134 is formed with a diametrally-opposed pair of ramped notches 140 (FIGS. 9, 12, 13), to act as cam surfaces in the manner described below. The bush 132 is fitted with a pair of radially projecting pins 42 (FIGS. 8 and 9) which lie within the notches 140 when the shear pin 136 is unbroken. However, when the shear pin 136 breaks and the bush 132 rotates relative to the socket 134, the pins 142 engage the sides of the notches 140 and cam out of these notches. This results in partial axial separation of the bush 132 from the socket 134, of an extent sufficient to dislodge the socket 134 from its seating on the periphery of the bush 132. This prevents immediate re-use of the pin socket assembly 130 (possibly with an unauthorised substitute shear pin), and also provides a ready visual indication that the shear pin 136 has broken. An inperforate metal disc 144 (FIGS. 9 and 10) is fitted between the bush 132 and the socket 134 to blank off the interior of the bush 132 from the exterior of the socket 134.

Referring again to FIG. 7, the pin socket assembly 130 is biassed towards the socket end 112 of the wrench head body 110 by a spring 146 (corresponding to the spring 32 in FIG. 4) which bears against a cup-shaped flange member 148 rotatably mounted on the shaft 128. As shown in the lower half of FIG. 7, the flange member 148 seals against the end of the sleeve 126 to prevent dirt reaching the interior of the wrench head when it is not in use.

Figure 14:
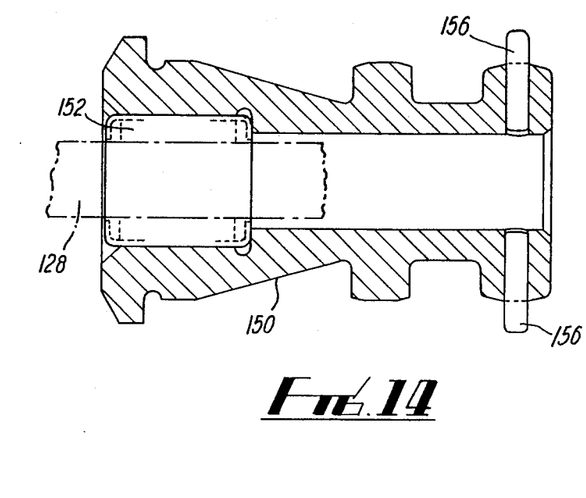
FIG. 14 is a sectional view of a sub-assembly employed in the wrench of FIG. 7.

At the other end of the wrench head shown in FIG. 7 is a bayonet tube 150 which functionally corresponds to the bayonet tube 44 of FIGS. 3 and 5, though dimensional details are different. The bayonet tube 150 is shown separately and to an enlarged scale in FIGS. 14 and 15. Whereas in the first embodiment, the bayonet tube 44 was linked to the shaft 34 by a hexagonal bore 42 engaging a hexagonal nut 38 on the shaft 34, in the second embodiment the bayonet tube 150 is coupled to the shaft 128 through a uni-directional clutch 152 housed within one end of the bayonet tube 150. The clutch 152 is rotationally polarised such that the shaft 128 is coupled to the bayonet tube 150 when the nut is being tightened on to the bolt 2. The structure of the clutch 152 also allows the shaft 128 to slide axially through the bayonet tube 150 in either direction. This rotational polarisiation of the clutch 152 allows the shaft 128 and hence the pin socket assembly 130 to rotate independently of the rest of the wrench head when the wrench head is undergoing reverse rotation to slacken a previously tightened nut from a bolt of the FIG. 1 type, i.e. in which the pin head 10 is not free to rotate relative to the bolt from which the nut is being unscrewed. The clutch 152 may be a Torrington type "RC 040708".

Figure 6A:
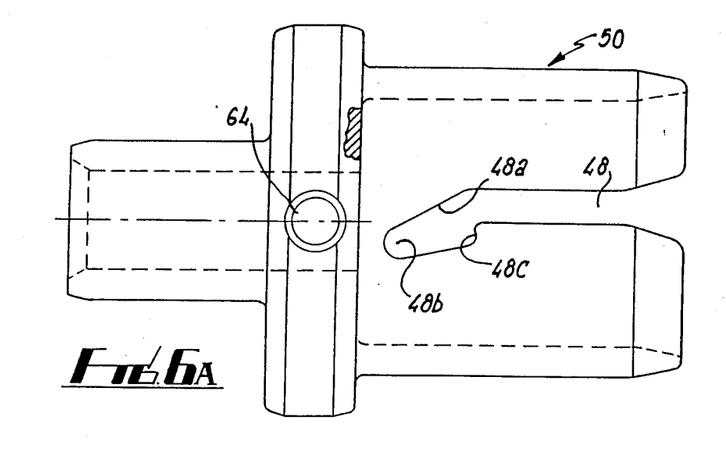
FIGS. 6A, 6B, and 6C are side, end and cross-sectional views, respectively.
Figure 6B:
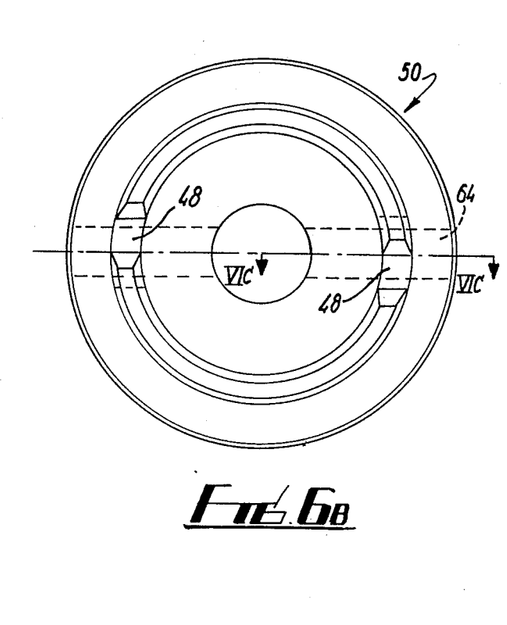
Figure 6C:
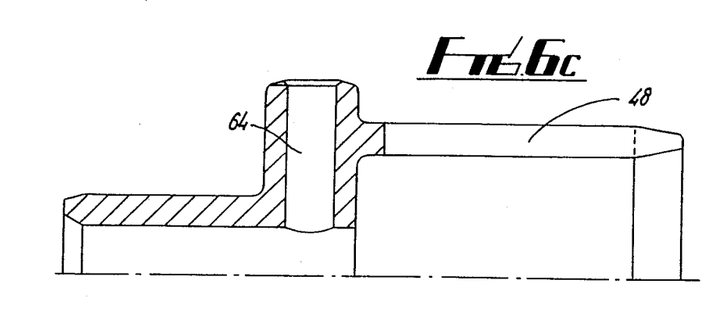

The wrench head further includes a cam tube 154 functionally corresponding to the cam tube 50 of FIGS. 3 and 6, though some dimensional details are different. The bayonet tube 150 has a diametrally-opposed pair of radially projecting pins 156 which link to the bayonet slots 155 in the cam tube 154 (corresponding to the pins 46 and the slots 48 in FIGS. 3 and 6). The cam tube 154 is prevented from rotating relative to the wrench head body 110, while being allowed to slide relative thereto, by a diametrally-opposed pair of radially projecting pins 158 engaging a pair of axial slots 160 formed along the inner surface of the body 110 (corresponding to the pins 52 and the key ways 54 shown in FIG. 3).

As in the first embodiment, the cam tube 154 has an actuating button 162 with a red sleeve 164. The cam tube 154 is biassed towards the end of the wrench head body 110 by a spring 166 (corresponding to the spring 60 in FIG. 3) such as to project the button 162 beyond the wrench head end cap 168 and display the red sleeve 164 (upper half of FIG. 7) unless restrained within the cap 168 by latching interaction of the bayonet tube 150 with the cam tube 154 (lower half of FIG. 7). The basic tension indicating operation of the second embodiment is the same as previously described in respect of the first embodiment, and the second embodiment differs principally from the first in regard to having the above-described overload protection features.

Figure 15:
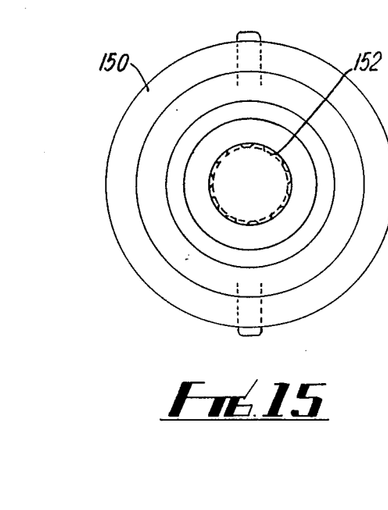
FIG. 15 is an end view of the sub-assembly of FIG. 15.

FIG. 15 shows a modified version of the wrench described with reference to FIGS. 7 to 14. The construction and operation of this modified version are similar to the foregoing except for the modifications described below, and like parts are denoted by like reference numerals.

Figure 16:
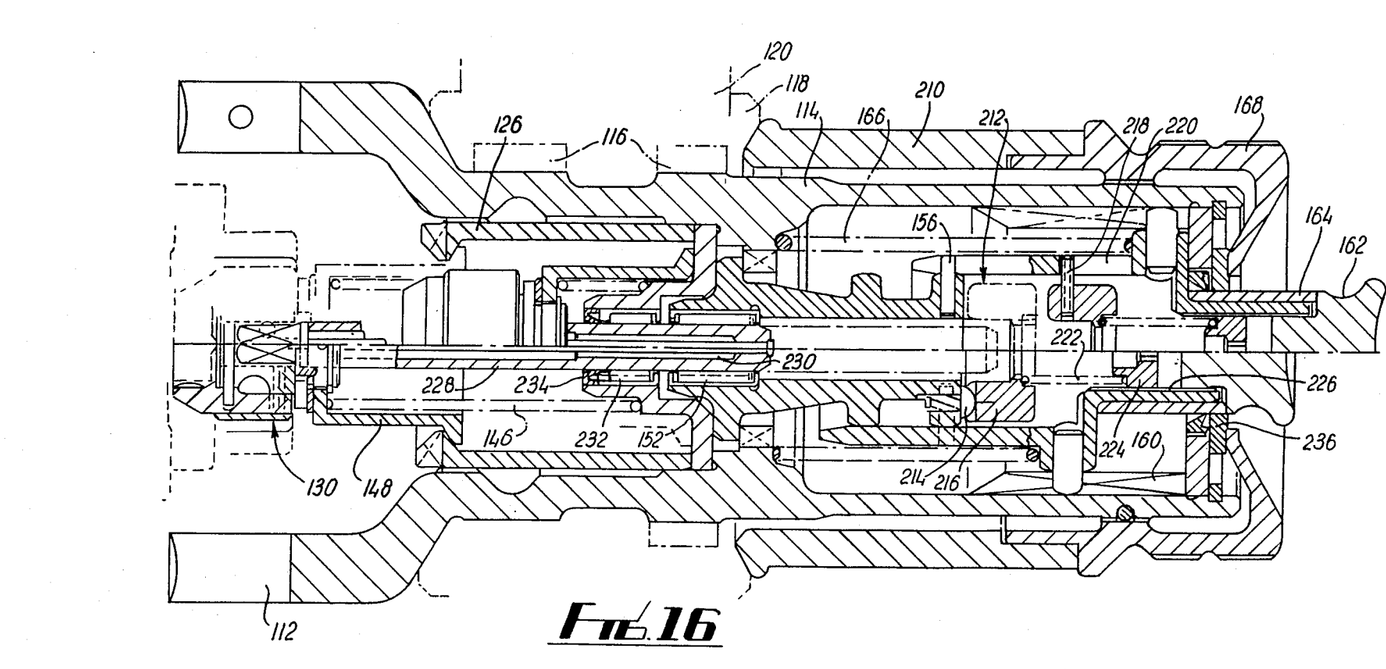
FIG. 16 is a view similar to FIG. 7 of a modified form of the second embodiment.
Figure 17A:
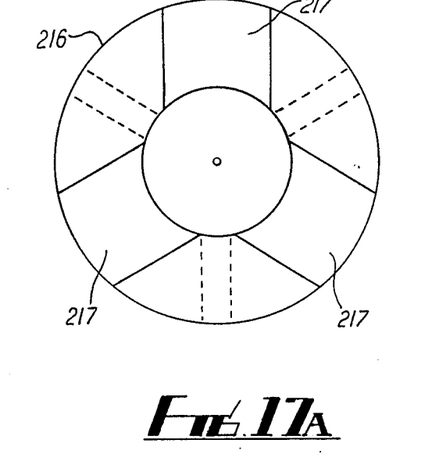
FIG. 17A, 17B and 17C are respectively end, plan and cross-sectional side views of a cam plate forming part of the wrench of FIG. 16.
Figure 17B:
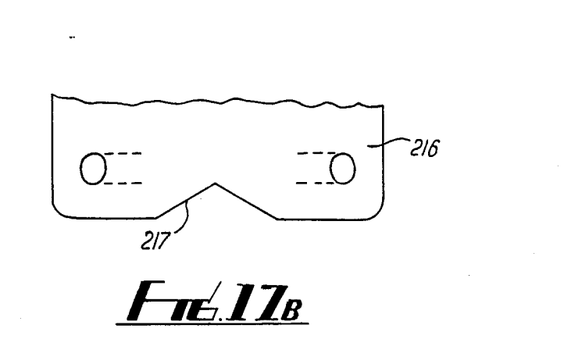
Figure 17C:
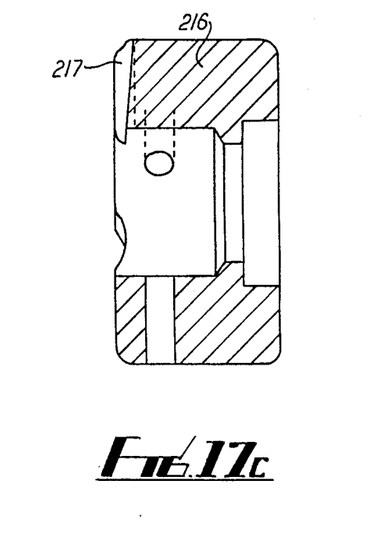

The ratchet 118 and handle 120 cooperate with the ratchet tooth section 116, which is repositioned nearer the operative end of the housing 114. This gives better balance to the tool in use, with less tendency to tilt off the bolt axis as force is applied. A cover sleeve 210 is mounted to the end cap 168 to span the space between the latter and the ratchet tooth section 116. The cover sleeve 210 may suitably be engraved or printed with operating instructions for the wrench.

A cam arrangement generally designated at 212 is provided in conjunction with the bayonet tube 150. The cam arrangement 212 comprises three equi-spaced pins 214 having dome heads engaging is three equi-spaced V-slots 215 formed in a cam plate 216. The cam plate is mounted for axial movement relative to the cam tube 154 by radially projecting pins 218 engaging in axial slots 220. The cam plate 216 is urged into contact with the pins 214 by a coil spring 222 trapped between the cam plate 216 and a calibration screw 224 engaged in a screw-threaded bore 226 of the cam tube 154. The calibration screw can be adjusted to set the axial force exerted by the spring 222 on the cam plate 216, this in turn determining the torque required to release the bayonet coupling.

The solid cylindrical shaft 128 is replaced by a hollow shaft 228, and the pin socket assembly 130 is carried on one end of a spring steel wire 230 which is located within, and has its other end welded to the inboard end of, the follow shaft 228. The wire 230 transmits torque from the pin socket assembly 130 to the clutch 152, while allowing a limited radial movement of the pin socket assembly 130 to accommodate any non-concentricity of the pin head 10 with respect to the bolt 2.

There are two more minor modifications. The bearing bush 124 is replaced by a needle bearing 232 and lip seal 234. The end cap 168 is provided with a larger central aperture to facilitate movement of the sleeve 164, and this aperture is provided with a felt washer 236 to act as a dust seal.

Other modifications and variations may be made without departing from the scope of the invention as defined in the claims.

We claim:

1. A wrench for use with a nut and bolt combination in which the bolt has an axial bore in its stem and a pin member located within the bore; the wrench comprising a first engagement member for rotational engagement with one of the nut and the bolt head, a second engagement member for rotational engagement with said pin member, a common drive member for simultaneous rotation of the first and second engagement members, and detection means for detecting a change in resistance to the rotation of the second engagement member.

2. The wrench of claim 1, in which the drive member comprises a handle manually rotatable about the axis of rotation of the first and second engagement members.

3. The wrench of claim 1, in which the detection means comprises a torque coupling interposed between the drive member and the second engagement member, the torque coupling being arranged to disengage when the resistance to rotation of the pin member exceeds a predetermined level.

4. The wrench of claim 3, in which the torque coupling comprises at least one pin seated, during engagement of the coupling, in a detent and displaceable therefrom by a resistive torque.

5. The wrench of claim 4, in which said detent forms part of a bayonet slot formed in an axially movable member carrying a visual indicator for indicating the condition of the coupling.

6. The wrench of claim 4, in which the second engagement member is connected to the torque coupling by a torque transmitting assembly.

7. The wrench of claim 6, in which said torque transmitting assembly includes a one-way clutch.

8. The wrench of claim 6, in which the torque transmitting assembly includes a shear coupling arranged to shear at a predetermined load.

9. The wrench of claim 6, in which the torque transmitting member includes a transversely resilient member mounting the second engagement member to have limited transverse movement in relation to the first engagement member.

10. The wrench of claim 6, including adjustable cam means for applying an adjustable rotational resistance to the torque transmitting assembly.

11. The wrench of claim 4, in which the second engagement member is connected to the torque coupling by a torque transmitting assembly comprising:
a one-way clutch,
a shear coupling arranged to shear at a predetermined load, and
a transversely resilient member which mounts the second engagement member to have limited transverse movement in relation to the first engagement member.

* * * * *